United States Patent Office 3,050,538
Patented Aug. 21, 1962

3,050,538
MOLYBDENUM BLUE COMPLEXES
Georges Hugel, Le Menastere, Ville d'Avray, and Moise Lerer, Paris, France, assignors to Institut Français du Petrole des Carburants et Lubrifiants, Paris, France, a corporation of France
No Drawing. Filed Apr. 16, 1958, Ser. No. 728,798
Claims priority, application France Apr. 19, 1957
10 Claims. (Cl. 260—429)

This invention is concerned with improvements in or relating to molybdenum blue complexes and lubricating compositions containing such complexes.

For many types of lubrication, lubricating compositions are required which can withstand elevated temperatures, which may reach and even exceed 120° C., for extended periods without decomposition or alteration. For this reason, lubricating oils for internal combustion engines have to undergo alteration tests, such as that in which the lubricant is heated to 115° C. in the open air for 72 hours in the presence of metals such as copper, iron, aluminium or lead. For the result of this test to be favourable, there must be no formation of deposits, the metals must not be attacked, and after dilution of the lubricant with normal hexane no precipitation of asphaltic substances must be detectable.

Molybdic complexes which are soluble in hydrocarbons are of particular interest as additives in lubricating compositions, because in decomposing, particularly under the effect of the temperatures attained through friction, they form on the metal parts subjected to friction a protective coating which prevents the detachment of metallic particles and thus ensures efficient lubrication, particularly under conditions of extreme pressure.

Among the molybdic complexes in question, mention may be made in particular of the complexes formed by molybdenum blue with phosphorus compounds such as trialkyl phosphates, dialkyl amidodialkyl phosphates, trialkyl thiophosphates, dialkyl amidodialkyl thiophosphates and the alkyl phosphonates corresponding respectively to the following formulae:

$$O=P\begin{smallmatrix}OR\\-OR\\OR\end{smallmatrix} \quad O=P\begin{smallmatrix}NR'_2\\-OR\\OR\end{smallmatrix} \quad S=P\begin{smallmatrix}OR\\-OR\\OR\end{smallmatrix} \quad S=P\begin{smallmatrix}NR'_2\\-OR\\OR\end{smallmatrix}$$

and $$O=P\begin{smallmatrix}OR'\\-OR'\\R\end{smallmatrix}$$

in which R and R' are aliphatic groups containing from 2 to 12 carbon atoms.

All these compounds are characterised by the fact that all the acid functions of phosphoric or thiophosphoric acid from which they are derived are blocked by alkyl or alkylamide radicals, and they have the disadvantage of partially decomposing when exposed for a long time to the relatively high temperatures which lubricating oils for engines must, in particular, be able to withstand.

Their use as additives to lubricants is therefore limited to those cases in which the lubricating oil is not subjected to elevated temperatures before coming into contact with the metal parts to be lubricated.

It is an object of the present invention therefore, to provide new complexes of molybdenum blue which are soluble in hydrocarbons and which, while possessing the property of decomposing at the temperatures attained by friction during lubrication (that is at a temperature of from 200 to 220° C.), do not have the disadvantage of even partially decomposing at the somewhat lower temperatures to which lubricating oils may be exposed under the conditions of their use in internal combustion engines prior to coming into contact with the metal parts to be lubricated, which temperatures may attain and even exceed 115 to 120° C. Only with compounds which are thermally stable at these lower temperatures is it possible to avoid the formation of deposits in the oils and a consequently inadequate protective coating of the metal parts.

The requirement that the molybdenum blue complexes should be decomposed at a temperature of from 200° to 220° C. is also very important, since if the decomposition occurs only at higher temperatures, the rubbing surfaces will already have been damaged before the protective coating resulting from the decomposition of the complexes is produced.

We have now most surprisingly found that complexes of molybdenum blue with phosphorus compounds which, in contradistinction to those mentioned above, contain a free acid function and are of the general formula:

$$X=P\begin{smallmatrix}Y\\-OR\\OH\end{smallmatrix}$$

wherein X is oxygen or sulphur, R is hydrogen, an aliphatic group containing at least 4 carbon atoms, a halogen- or sulphur function-substituted aliphatic group containing at least 4 carbon atoms, an aryl group, a halogen-, sulphur function- or alkyl-substituted aryl group, or a polyoxyethylene monoether residue, and Y is a monovalent organic group of the formula OR', NHR" or NR₂", where R' is an aliphatic group containing at least 4 carbon atoms, a halogen- or sulphur function-substituted aliphatic group containing at least 4 carbon atoms, an aryl group, a halogen-, sulphur function- or alkyl-substituted aryl group, or a polyoxyethylene monoether residue; and R" is an aliphatic group containing at least 2 carbon atoms, have the decomposition properties mentioned above, that is they are not decomposed at temperatures up to and exceeding 120° C. and are decomposed at a temperature of from 200° to 220° C., and are soluble in a wide variety of lubricating compositions.

According to the present invention therefore, there are provided complexes of molybdenum blue with phosphorus compounds of the above-stated general formula.

This general formula represents, in particular, the following phosphorus compounds:

$$O=P\begin{smallmatrix}OR'\\-OR\\OH\end{smallmatrix} \quad O=P\begin{smallmatrix}OR'\\-OH\\OH\end{smallmatrix} \quad S=P\begin{smallmatrix}OR'\\-OR\\OH\end{smallmatrix} \quad S=P\begin{smallmatrix}OR'\\-OH\\OH\end{smallmatrix}$$

$$O=P\begin{smallmatrix}NR''_2\\-OR\\OH\end{smallmatrix} \quad O=P\begin{smallmatrix}NR''_2\\-OH\\OH\end{smallmatrix} \quad S=P\begin{smallmatrix}NR''_2\\-OR\\OH\end{smallmatrix} \quad S=P\begin{smallmatrix}NR''_2\\-OH\\OH\end{smallmatrix}$$

wherein R, R' and R" have the above meanings.

The high degree of stability of these molybdenum blue complexes appears to result from the fixation of the molybdenum blue on the free acid function of the phosphorus compound so as to give a stable product, whereas in the case of the phosphorus compounds which have no free acid function the molybdenum blue is bound only by secondary covalencies to the phosphorus compound, giving a less stable complex.

The phosphorus compounds from which the molybdenum blue complexes according to the invention are derived, may be prepared by any suitable method, processes for the preparation of these compounds being known. Suitable processes are, for example, as follows:

(1) *Preparation of dialkyl thiophosphates.*—Dialkyl thiophosphates can be prepared by transesterification, for example by reacting, in a first stage, 1.1 mols of diethyl phosphite with 2 mols of a higher alcohol and then treating the dialkyl phosphite obtained, in a second stage, with an equivalent amount of sulphur at about 115° C.

(2) *Preparation of dialkyl phosphites.*—As an example, the following process may be employed:

151.8 g. (1 mol) of diethyl phosphite of the formula:

and 484 g. (2 mol) of cetyl alcohol are gradually heated to 150° C. in a balloon flask surmounted by a small fractionation column. After heating for 3 hours at this temperature no further ethyl alcohol is distilled off. The pressure is then gradually reduced down to 10 mm. of mercury in order to drive off the rest of the ethyl alcohol and the excess of diethyl phosphite. 531 g. of dicetyl phosphite of a pale yellow colour and with a melting point of 39–40° C. are thus obtained.

The same method may be used to obtain dilauryl phosphite and dioleyl phosphite (these are liquid at room temperature) and distearyl phosphite having a melting point of about 56° C.

(3) *Preparation of dialkyl thiophosphates.*—Dicetyl thiophosphate can be obtained, for example, by heating a mixture containing 106 g. (0.2 mol) of dicetyl phosphite and 7 g. of sulphur (0.2 at.+0.6 g.) for 8 hours at about 115° C. The product of the reaction is then dissolved in 106 cc. hexane, filtered at room temperature and concentrated in a water bath, at first under atmospheric pressure and then under a reduced pressure of approximately 15 mm. mercury. In this way 111 g. of solid dicetyl thiophosphate having a melting point of 35–36° C. are obtained.

Dilauryl thiophosphate and dioleyl thiophosphate, which are both liquid at room temperature, and distearyl thiophosphate having a melting point of 51–52° C., can also be prepared in the same way.

(4) *Preparation of monoaryl phosphates.*—Monoaryl phosphates can be prepared, for example, by hydrolysis of an aryl dichlorophosphate at a temperature of about 60° C.

(5) *Preparation of amidophosphoric acid esters.*—A suitable method of preparing amidophosphoric acid esters is, for example, as follows:

One mole of phosphorus oxychloride is reacted with 2 moles of a secondary amine or, as is preferable in order to limit the violent nature of the reaction and obtain a purer product, the hydrochloride of the amine is reacted with an excess of phosphorus oxychloride at boiling temperature.

The phosphorus dialkylamido-oxydichloride thus obtained is then reacted with an equimolecular mixture of alcohol and sodium alcoholate. The reaction is rapid even at room temperature, but it is expedient to heat to 160° C. in order to cause the sodium chloride formed to be deposited in a readily filterable form.

The amidophosphoric ester thus obtained is separated from the other reaction products and solvents by distillation under reduced pressure. It is unnecessary for it to be purified before being used to form molybdenum blue complexes according to the invention.

The molybdenum blue complexes according to the invention are prepared by reacting a phosphorus compound of the above-stated general formula with a partially reduced aqueous solution of molybdic acid at a temperature up to the boiling point of the reaction mixture.

The preparation of the partially reduced solution is of great importance in forming the molybdenum blue complexes according to the present invention. In no case should the molybdic acid solution become blue, either when cold or hot, as a blue complex must not be formed except in the presence of the phosphorus compound. These conditions are essential in order to obtain complexes soluble in lubricating oils while ensuring an efficient utilisation of the molybdic acid. At the same time, losses of molybdenum through the formation of water-soluble blue are also obviated.

A solution conforming to the above-mentioned conditions can be obtained, for example, by dissolving sodium molybdate in an aqueous solution of sulphuric acid at the rate of one part of sodium molybdate to about 15 parts of sulphuric acid and 40 parts by water (parts by weight). The solution is then partially reduced with about 0.015 part of aluminium. A solution having the degree of oxidation: $Mo_2O_5, 3MoO_3$ is thus obtained.

An identical solution can be obtained by mixing 3 parts of the above-described non-reduced solution with 2 parts of the same solution in which the molybdenum has been reduced to a valency of 5 by the addition of 0.015 part of aluminium per part of sodium molybdate.

The composition of the non-reduced solution of sodium molybdate is indicated solely by way of example, and without limitation.

Any other suitable molybdic acid solution may be employed provided that the solution after partial reduction only forms a molybdenum blue complex in the presence of the phosphorus compound.

It will be apparent that in place of sodium molybdate, other molybdates can be used, such as potassium molybdate, ammonium molybdate, etc., or even anhydrous or dehydrated molybdic acid rendered soluble by treatment with acid. The sulphuric acid may also be replaced by other mineral acids which do not have an oxidising or reducing effect under the conditions of operation.

The molybdenum blue complexes are preferably formed by introducing the partially reduced molybdic acid solution into a balloon flask having three lateral tube connections and provided with a mechanical stirring device, a reflux condenser and a thermometer, or into any equivalent apparatus, and the phosphorus compound is then added, in proportions respectively of from 1 to 3 moles of phosphorus compound per mole of molybdic acid. These proportions are mentioned merely by way of example and are in no sense limitative, as it is clear that the product obtained will be the richer in molybdenum blue, the smaller the proportion of phosphorus compound to molybdic acid.

In order to promote contact between the molybdic acid solution and the phosphorus compound it is sometimes expedient to carry out the reaction in the presence of an inert organic solvent, such as for example hexane, heptane, benzene or xylene. The quantity of solvent used for this purpose may, for example, be equivalent in weight to that of the phosphorus compound.

The temperature of reaction is preferably between 50° C. and the boiling point of the molybdic acid solution (of the order of 105 to 110° C.). A lower temperature than 50° C. would have the disadvantage of not allowing an adequate rate of reaction to be maintained. The duration of the reaction varies with the temperature. At 50° C. the reaction requires several hours: at the boiling temperature of the molybdic acid solution the time required is reduced to only 15 minutes. The progress of the reaction may be readily followed on a colorimeter. Particularly good results are obtained by stopping the reaction as soon as maximum extinction at a wave-length of approximately 610 m$\mu$ is attained for the reaction product dissolved in hexane.

The molybdenum blue complex thus obtained may contain varied amounts of the phosphorus compound.

Products very rich in the molybdenum blue complexes according to the invention can be obtained either by fractionation with the solvent or, better still, by passing the reaction product in solution in a solvent through columns filled with adsorbent substances such as silica gels, for example.

Instead of reacting the phosphorus compound with a molybdic acid solution which has already been partially reduced as described above, the partial reduction may be effected in situ, that is by the direct reaction of the phosphorus compound and a reducing metal, such as aluminium, with an acidic, non-reduced, dilute aqueous solution of a molybdate (that is containing, say 150 mg. of molybdate per cc. of water and at least 0.5 g. of $H_2SO_4$ of 66° Baumé per cc. of water or the equivalent thereof). The reaction mixture is preferably kept boiling for about 15 minutes, and after intensive cooling of the solution, a neutral inert organic solvent, such as hexane, heptane, benzene or xylene, is introduced into the reaction mixture the quantity of solvent added being, for example, equal to that of the phosphorus compound. The molybdenum blue complex then forms exclusively in the supernatant organic phase. When separated from the solvent by distillation under reduced pressure, it is in the form of an oily liquid of a deep blue colour containing variable amounts of the phosphorus compound. The unreacted molybdate can be recovered from the aqueous phase and used again.

As indicated above, the molybdenum blue complexes according to the invention possess properties which render them valuable as additives to lubricants. More particularly they are thermally stable up to temperatures of the order of 120° C.; they can be subjected to open air alteration tests, as mentioned above (72 hours at 115° C. in the presence of metals) without undergoing alteration or decomposition, and they are decomposed at temperatures of the order of 200° C.

The molybdenum blue complexes according to the invention are readily soluble in a wide variety of lubricating compositions. Among these complexes, those which are most soluble in mineral and synthetic oils based on hydrocarbons, such as aliphatic, naphthenic, hydroaromatic and aromatic hydrocarbons, are those derived from phosphorus compounds in which the substituent R, as defined above, is an aliphatic radical, preferably a higher aliphatic group. Particularly soluble complexes in oils of this type are those derived from phosphorus compounds of the formula

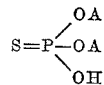

wherein A is an aliphatic group containing more than 4 carbon atoms. Such complexes alone or in combination with the phosphorus compounds from which they are derived are advantageously employed as additives to lubricating oils of this type.

On the other hand, the presence of an aryl group, which may be substituted with long chain alkyl groups, gives the phosphorus compound, and consequently the molybdenum blue complex of said compound, a very high solubility in organic solvents other than hydrocarbons, such as for example animal or vegetable oils, castor-oil, or synthetic products such as tricresyl phosphate and polyethylene glycol. Thus, for example, thiophosphates of the formula:

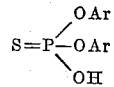

(in which Ar is an aryl radical), and their complexes with molybdenum blue, are soluble in tricresyl phosphate and such complexes alone or in combination with the said thiophosphates are advantageously employed together with tricresyl phosphate in lubricating compositions.

A further series of thiophosphates of special interest, are those of the formula:

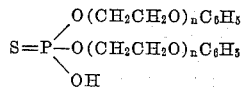

(where $n$ is an integer, preferably of from 4 to 9), as they are characterised by their high degree of solubility in polyethylene glycols; the complexes which they form with molybdenum blue are likewise soluble in polyethylene glycols and said complexes alone or in admixture with the thiophosphates from which they are derived are advantageously used in lubricating compositions based on polyethylene glycols.

In order that the invention may be more fully understood the following examples are given by way of illustration only:

EXAMPLE 1

A solution containing:

100 parts by weight of sodium molybdate $Na_2MoO_4$, $2H_2O$,
4200 parts by weight of water,
1450 parts by weight of sulphuric acid of 66° Baumé, was reduced while boiling with 1.48 parts of aluminium.

The solution was allowed to cool to 90° C. and 70 parts by weight of dicetyl thiophosphate were added thereto. This temperature was maintained for 30 minutes, while stirring the mixture; stirring was then stopped and the mixture was allowed to cool to room temperature. The aqueous layer was then siphoned off and the blue complex was extracted with 56 parts by weight of benzene; after elimination of the thin aqueous layer which separated from the extract, the extract was dried by passing it through a column containing anhydrous magnesium sulphate. Concentration in the water bath was then effected, first at atmospheric pressure and then under a reduced pressure of 15 mm. mercury. 74 parts by weight of a solid crude product, blue-black in colour, which was ready for use in this state as an additive to mineral oils, were thus obtained. This crude product could be improved by purification and enrichment of the molybdenum blue complex by proceeding as follows:

45 g. of the crude product were dissolved in 100 cc. of petroleum hexane and the solution thus obtained was passed through a column having an internal diameter of 30 mm., filled with activated silica gel in powder form (granulometry 25 to 40) to a height of 2 metres. The column was washed with hexane until the solvent was discharged almost colourless. The hexane solution was then concentrated on a water bath, first at atmospheric pressure and then at a reduced pressure of 15 mm. mercury.

The final product obtained was blue-black in colour and of a hard glossy appearance. It was soluble in organic liquids, particularly in hydrocarbons such as hexane, heptane, benzene, toluene and mineral oils, to which it gave a strong blue colour.

A solution of the crude product in hexane gave the following result on the colorimeter:

Apparent coefficient of extinction $$(\lambda=610\ m\mu)\ E_{1\ cm.}^{1\ mg./cc.}=0.70$$

A similar solution of the purified product gave the following result:

Apparent coefficient of extinction $$(\lambda=610\ m\mu)\ E_{1\ cm.}^{1\ mg./cc.}=2.19$$

As these solutions conform well to the Beer-Lambert law, it is seen that the crude product after passing over silica gel has become three times richer in molybednum blue complex.

The purified product, in solution in a pure mineral oil SAE 30, at concentrations respectively of 1% and 4%, gave the following comparative results on the "4 ball machine" (described by Boerlage in the periodical "Engineering" of July 14, 1953):

Tests on the 4 Ball Machine

| Loads applied in kg. | Pure SAE 30 oil | SAE 30 oil + 1% of complex | SAE 30 oil + 4% of complex |
|---|---|---|---|
| | | Seizing times in seconds | |
| 120 | 2 | >60 | >60 |
| 150 | 2.5 | >60 | >60 |
| 170 | instantaneous seizing | >60 | >60 |
| 180 | | >60 | >60 |
| 190 | | instantaneous seizing | >60 |
| 200 | | | 8 |

The above table shows the clear improvement in the seizing time effected by adding to the base oil a relatively small amount of the molybdenum blue complex derived from dicetyl thiophosphate.

In addition, it should be observed that the tests were performed with new balls in the machine for each test. The use of balls which had served for previous tests, when applying progressively higher loads, would have made it possible to attain much greater pressures without seizing, owing to the continual deposition on the balls of a layer of molybdenum compound.

Furthermore, both the crude and the purified product suffered no alteration or decomposition after having undeargone an oxidation test for 72 hours in the open air in the presence of copper, iron, aluminium or lead.

EXAMPLE 2

The same partially reduced molybdic acid solution as that described in Example 1 was treated while boiling with 70 parts by weight of dilauryl thiophosphate, the mixture being maintained at boiling temperature and continuously stirred for 15 minutes.

After separation, extraction with hexane and concentration, a semi-liquid product was obtained which was deep blue in colour and the stability of which was demonstrated by an oxidation test effected under the same conditions as described in Example 1.

EXAMPLE 3

The procedure was the same as in Example 1, but the dicetyl thiophosphate was replaced by an equal weight of dioleyl thiophosphate. 70 parts by weight of liquid molybdenum blue complex having a strong blue colour, which was likewise shown to be highly stable after having undergone the above-described oxidation test, were obtained.

EXAMPLE 4

The procedure was the same as in Example 1, but the dicetyl thiophosphate was replaced by an equal weight of distearyl thiophosphate and 56 parts by weight of benzene were added to the reaction mixture and heating was effected with reflux of the benzene.

After concentration, 70 parts by weight of a crude complex having a blue colour were obtained, which underwent no alteration or decomposition when subjected to the above-mentioned oxidation test.

EXAMPLE 5

Monophenylphosphate was obtained by hydrolysis of phenyl dichlorophosphate (the latter substance can be prepared as described by P. Brigl and H. Miller, Ber., 72B, page 2121 (1939)), using 50 cc. of water per mole of phenyl dichlorophosphate. The two products were introduced alternately in small amounts (5 cc. of water to 16 cc. of phenyl dichlorophosphate, about every ten minutes) into a reaction vessel maintained at a temperature of 50 to 60° C. The reaction mixture was continually stirred during the introduction of the reagents and for 2 hours thereafter. During the last hour a reduced pressure (for example 250 mm. mercury) was maintained in the reactor in order to facilitate total elimination of the hydrochloric acid formed. The excess water was then eliminated by lowering the pressure to 20 mm. mercury and gradually raising the temperature to 80° C. Monophenylphosphate was extracted with chloroform in a Soxhlet flask and was obtained in a yield of 80% in relation to the theoretical yield.

Preparation of a molybdenum blue complex from the monophenylphosphate was effected as follows:

An aqueous solution containing hexavalent molybdenum was prepared by dissolving 167 parts by weight of sodium molybdate and 2400 parts by weight of sulphuric acid of 66° Baumé in 7000 parts by weight of water. A solution containing quadrivalent molybdenum was then prepared by reduction of the aforementioned solution with the stoichiometric quantity of aluminium. The following were then introduced into a reaction vessel:

672 parts by weight of the hexavalent molybdenum solution,
448 parts by weight of the quadrivalent molybdenum solution,
13.9 parts by weight of monophenylphosphate,
200 parts by volume of methyl isobutyl ketone.

The mixture was stirred at rom temperature for 4 hours on a shaking machine. The organic layer was separated by decantation, dried in the presence of anhydrous silica gel, and filtered. The filtrate was concentrated in a balloon flask on a bath of boiling water, the pressure being gradually reduced to 2 mm. mercury. In this wayl 16.5 parts by weight of molybdenum blue complex of a deep blue colour were obtained, which although solid was readily soluble in glycols and polyethylene glycols.

EXAMPLE 6

Diethylamido-dodecylphosphate was prepared in the following manner:

Phosphorus diethylamido-oxychloride was prepared by boiling a mixture of diethylamine hydrochloride (obtained, for example, by the action of dry hydrochloric acid gas on a solution of pure anhydrous diethylamine) and freshly distilled phosphorus oxychloride, containing, for example, one mol of diethylamine hydrochloride per 400 cc. of phosphorus oxychloride for about 18 hours. After distillation at atmospheric pressure so as to drive off the excess phosphorus oxychloride and then distillation under reduced pressure, phosphorus diethylamido-oxychloride was obtained (boiling point 93–94° C. under 15 mm. mercury), in a yield of 92%.

An equimolecular solution of dodecyl alcohol and sodium dodecyl alcoholate (obtained, for example, by the action of a solution of sodium amide in toluene on dodecyl alcohol at 100° C. was then gradually introduced portionwise into a reaction vessel containing phosphorus diethylamido-oxychloride, the final proportions of the reactants being one mole of dodecyl alcohol per mol of phosphorus diethylamidooxychloride, while stirring and cooling in such a manner as to keep the temperature at about 50° C. After heating to 160° C. the sodium chloride precipitated was eliminated. Diethylamido-dodecylphosphate, separated by distillation, was obtained in a yield of 78.5%.

100 parts by weight of $Na_2MoO_4, 2H_2O$, 1300 parts by weight of water, and 660 parts by weight of 66° Bé. sulphuric acid, were introduced into a balloon flask equipped with a stirrer means and a condenser. The mixture was heated to its boiling point and 180 parts by weight of diethylamido-dodecylphosphate and 1.75 parts by weight of aluminium were introduced into it.

After boiling for 17 minutes, followed by intensive cooling, 180 parts by weight of normal hexane were introduced; molybdenum blue formed immediately in the hexane layer. The latter, after separation from the aqueous layer and drying over magnesium sulphate, was distilled under a pressure of 2 mm. mercury. 198 parts by weight of an oily liquid of a strong blue colur were thus obtained.

The product obtained in this way was an excellent additive to lubricants; it enabled the lubricating qualities of lubricating oils or compositions in which it was dissolved to be markedly improved. In addition, it remained stable at temperatures up to at least 120° C.

By way of example, a lubricating composition referred to hereinafter by the reference $C_1$ and consisting of SAE 30 oil to which had been added 3% by weight of chlorinated paraffin and 1.5% by weight of dibenzyl glycol xanthate was subjected to tests on the Faville machine (described by Ryal at the "First Spring Meeting of the American Society of Lubrication Engineers," Chicago, April 5–6, 1946). These tests enable the lubricating power of the composition $C_1$ when used by itself to be compared with that of the same lubricating composition to which 1% by weight of the molybdenum blue complex derived from diethylamido-dodecylphosphate had been added.

The results of these tests are given in the following table:

| | | Voltage | | | |
|---|---|---|---|---|---|
| | | 80 | 100 | 120 | 140 |
| Lubricating composition $C_1$. | Jamming load. | 250 | 525 | 575 | 550 |
| | Torque | ε | 0.12 | 0.2 | 0.3 |
| Lubricating composition $C_1$ + 1% of molybdenum blue complex. | Jamming load. | 425 | 850 | 1,350 | 1,850 |
| | Torque | 0.04 | 0.16 | 0.27 | 0.44 |
| Lubricating composition $C_1$ + 1% molybdenum blue blue complex (after 72 hours of heating in the open air). | Jamming load. | 350 | 750 | 1,275 | >2,000 |
| | Torque | 0.04 | 0.14 | 0.26 | 0.42 |

The results shown in the above table indicate the improvement in performance resulting from the use of the molybdenum blue complex derived from diethylamido-dodecylphosphate as a lubricant additive. The jamming loads are decidedly greater for the same voltage than for the lubricating composition containing no molybdenum blue complex.

In addition, the constancy of the results after heating the lubricating composition containing the complex at 120° C. in the open air for 72 hours, proves that this complex does not, at this temperature, undergo any alteration or decomposition. This fact was confirmed by examining the shaft of the machine used for the above-described tests, which showed no signs of deterioration. If any alteration of the surface had occurred, a reduction in the jamming load would have been observed when continuing the tests with the same shaft while progressively increasing the voltage (from 140 to 180 volts). In fact no such reduction took place.

An oxidation test carried out in the same conditions as described above in the presence of iron, copper, aluminium or lead gave the same result.

We claim:

1. Complexes of molybdenum blue with phosphorus compounds of the general formula:

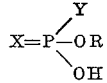

wherein X is selected from the group consisting of oxygen and sulphur, R is selected from the group consisting of hydrogen, phenyl and monovalent aliphatic hydrocarbon radicals containing from 4 to 18 carbon atoms, and Y is a monovalent organic radical selected from the group consisting of —OR' and —NR"$_2$ radicals, wherein R' is a monovalent aliphatic hydrocarbon radical containing from 4 to 18 carbon atoms and R" is a monovalent aliphatic hydrocarbon radical containing from 2 to 18 carbon atoms.

2. Complexes of molybdenum blue with phosphorus compounds of the general formula:

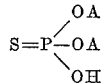

wherein A is a monovalent aliphatic hydrocarbon radical containing from 4 to 18 carbon atoms.

3. Complexes of molybdenum blue with a phosphorus compound of the formula:

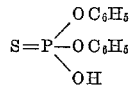

4. Complexes of molybdenum blue with phosphorus compounds of the general formula:

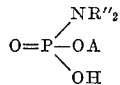

wherein R" is a monovalent aliphatic hydrocarbon radical containing from 2 to 18 carbon atoms, and A is a monovalent aliphatic hydrocarbon radical containing from 4 to 18 carbon atoms.

5. The complex of molybdenum blue with dicetyl thiophosphate.

6. The complex of molybdenum blue with dilauryl thiophosphate.

7. The complex of molybdenum blue with dioleyl thiophosphate.

8. The complex of molybdenum blue with distearyl thiophosphate.

9. The complex of molybdenum blue with monophenyl phosphate.

10. The complex of molybdenum blue with diethylamidododecyl phosphate.

References Cited in the file of this patent

UNITED STATES PATENTS

| | | |
|---|---|---|
| 2,500,195 | McDermott | Mar. 14, 1950 |
| 2,753,306 | Fields | July 3, 1956 |
| 2,777,874 | Asseff et al. | Jan. 15, 1957 |
| 2,805,997 | Benoit et al. | Sept. 10, 1957 |
| 2,852,469 | Hugel | Sept. 16, 1958 |
| 2,866,732 | Hoff et al. | Dec. 30, 1958 |